M. EYQUEM.
WIND SCREEN OF MOTOR CARS AND OTHER VEHICLES.
APPLICATION FILED MAR. 11, 1922.

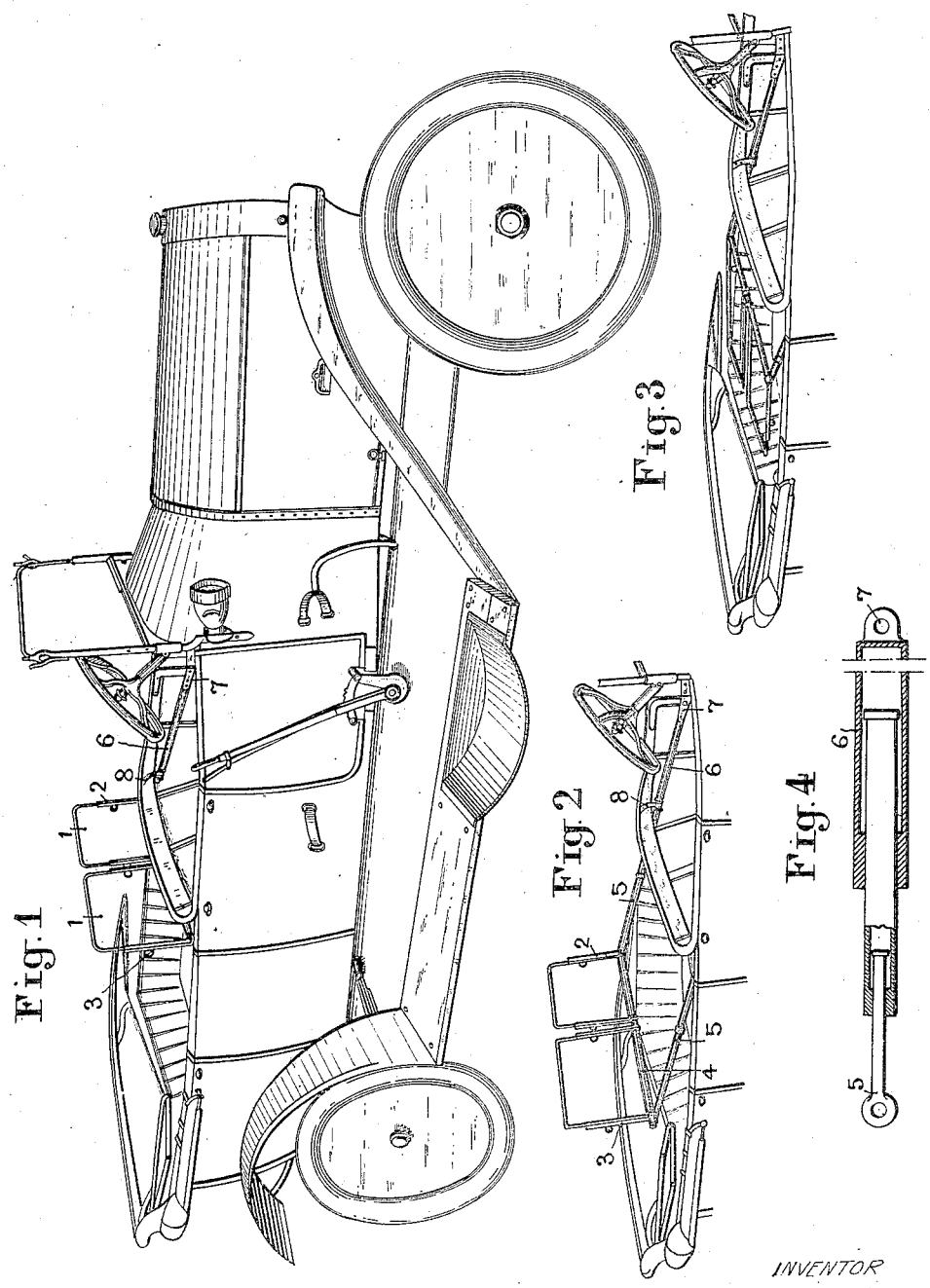

1,430,963.

Patented Oct. 3, 1922.
3 SHEETS—SHEET 2.

INVENTOR
Maurice Eyquem
BY
ATTORNEYS

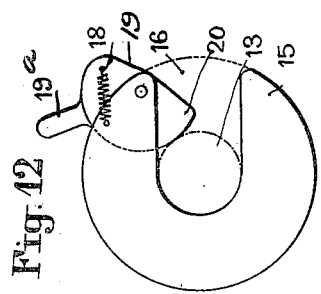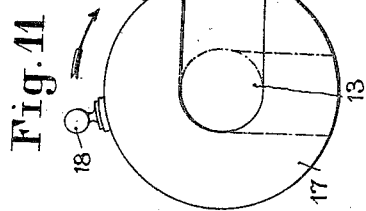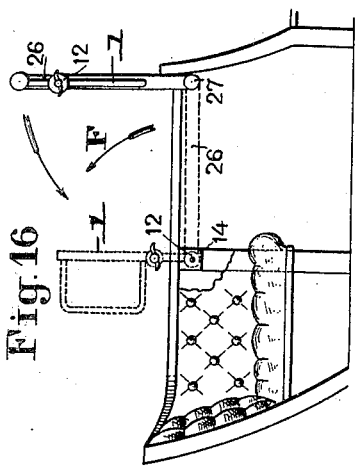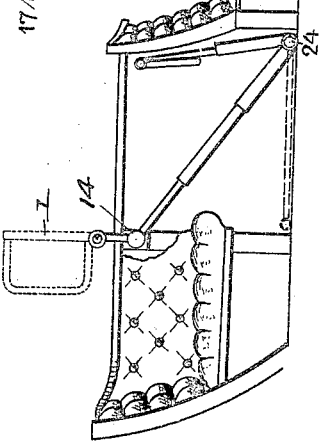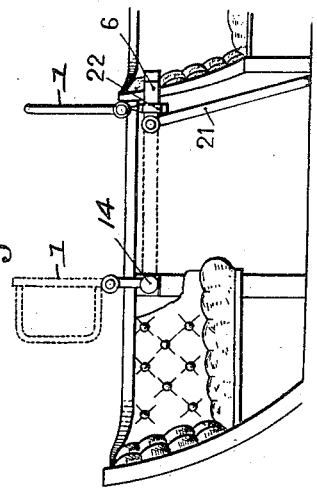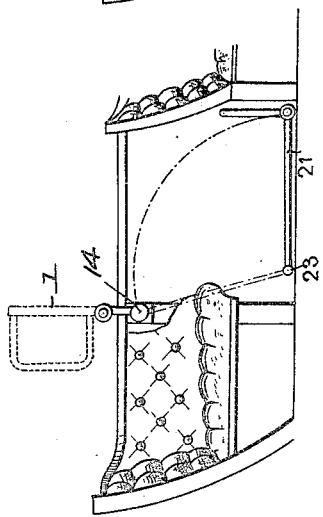

Patented Oct. 3, 1922.

1,430,963

UNITED STATES PATENT OFFICE.

MAURICE EYQUEM, OF PARIS, FRANCE.

WIND SCREEN OF MOTOR CARS AND OTHER VEHICLES.

Application filed March 11, 1922. Serial No. 543,071.

*To all whom it may concern:*

Be it known that I, MAURICE EYQUEM, a citizen of the French Republic, and residing in Paris, France, 191–193 Boulevard Pereire, have invented certain new and useful Improvements in and Relating to Improved Wind Screens of Motor Cars and Other Vehicles, of which the following is a complete specification.

This invention has for its object to provide an improved rigid mounting for the rear wind-screens of motor-cars and other vehicles.

It has already been proposed to provide for the protection of the rear seats of motor-cars of the "torpedo" build, wind-screens capable of being moved in such a way as to afford a more efficient protection for passengers occupying the rear seats.

That arrangement has no rigid point of support for the arms of the wind-screen when extended and the wind-screen is in use, and therefore the latter is always overhung so that when travelling over rough roads the wind-screen is subjected to continual oscillation due to the action of the vibration and jolting, which racks the entire apparatus and very soon renders it useless.

A wind-screen mounted in that manner is comparable to a load suspended from the end of an overhanging beam which transmits to its load any shocks and jolts that it may receive while intensifying them by the effect of its own resiliency or of the play in the joints.

These drawbacks are obviated by the present invention which provides for the heretofore known means of moving the wind-screen, an additional point of support fixed to the vehicle, the arrangement being such as to provide for the wind-screen a kind of bridge extending between its two positions of rest and use, thus ensuring the rigidity of the wind-screen in those said two positions.

The improved mounting is characterized more particularly by the feature that when the wind-screen is in its position of use, that is, in a position for protecting the rear seats, the wind-screen itself has a direct bearing upon a fixed point forming part of the vehicle; this fixed point being independent of the apparatus for opening or moving the wind-screen.

In the accompanying drawings which illustrate various constructional examples of the improved mounting:—

Fig. 1 shows a first constructional form of the wind-screen mounted upon a motor-car.

Figs. 2 and 3 are lateral elevations representing the said wind-screen in different positions of use.

Fig. 4 is a detail partly in section.

Figs. 10 and 11 are respectively side and front detail views of a constructional example of a device for fixing the pivot rod of the wind-screen.

Fig. 12 illustrates a modification of the construction shown in Fig. 11.

Figs. 13 to 16 illustrate modifications of the improved mounting for wind-screens.

Figure 8:
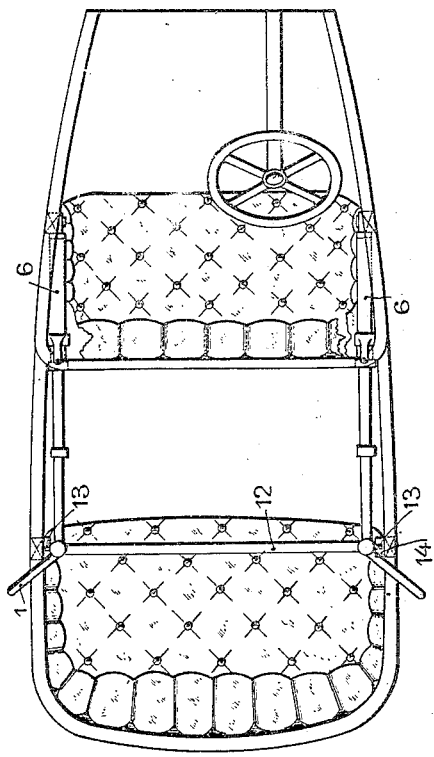
Figs. 8 and 9 are respectively a plan and a partial side elevation of a motor-car to which the improved mounting, forming the subject matter of the invention is applied.

In the arrangement of Figs 1 to 4, the rear wind-screen 1, which may comprise a glass either single or in several parts, is mounted in a frame 2, 3 the lower edge of which is solid with a spindle 4 carried in the rear ends of sliding levers 5. Each of the said sliding levers comprises a number of sections which are arranged for sliding one in the other and slidable in a tube 6 provided in the fore part of the car, the said tube being of convenient dimensions and secured through a lug 7; the said tube may also be kept in position by means of convenient screw-threaded bolts and of clasping means located in the point 8, the said part being secured either by a collar, or by only resting on the rear wall of the front seat.

The frame 2, 3 is arranged upon its spindle so as to occupy the position shown in Figs. 1 and 2 for the protection of the rear seats or to be brought back into its horizontal position thus forming a table as shown in Fig. 3 which, by sliding the arms, may be brought close to the travellers sitting upon the rear seats.

Above arrangement enables the rear wind-screens 1 to be kept in any part of the car for their use; when not in use, the said wind-screen may be brought back against the back of the front seat as shown in Fig. 1. When the parts are in the position shown in Fig. 1, the wind-screen can be turned so as to bring the panes 1 against the front seat back, thus completely hiding the said wind-screen.

The sliding arms 5 may be differently arranged, and they may be square, round, or polygonal in cross section. The several parts of the said sliding arms may be provided with locking means enabling the wind-screen to be rendered unmovable at any point in spite of the jolting of the car. The body may be provided with convenient brackets intended to constitute supporting points for the wind-screen, more particularly when the same is to be used as a table, in the position of Fig. 3.

The said brackets may be pivoted upon the wall so as to be brought close against the said wall.

Figure 5:
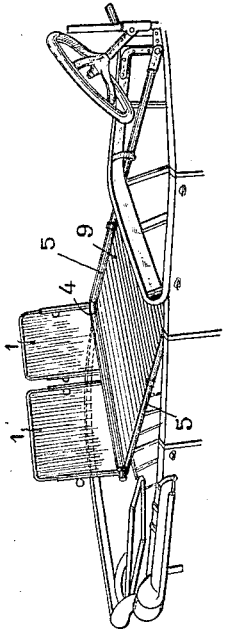
Fig. 5 is a side view of the wind-screen provided with a protecting apron.
Figure 6:
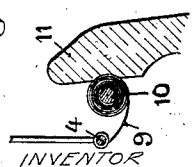
Fig. 6 is a diagrammatical view showing the arrangement of the apron of Fig. 5.

In order to prevent the wind blowing under the said wind-screen and against the rear seats, when the wind screen is in use I provide between the lower spindle 4 and the front seat back an apron 9 (Fig. 5) of a convenient substance such as leather or waterproof fabric, which thus constitutes a sort of blanket increasing the protection given to the rear seats. The said apron 9 is preferably rolled upon an automatic roller 10, which, as shown in Fig. 6, may be mounted on the back 11 of the front seats by means of convenient brackets or any other convenient means. The rear edge of the apron 9 is then secured or attached upon the lower spindle of the rear wind-screen. By that means, when the rear wind-screen is brought to the rear part of the car, the apron unrolls, thus winding the spring of the said drum 10 so that the apron is always resiliently kept taut, thus affording a good protection.

When the wind-screen is brought back into its position of rest, on the rear side of the front seat back, the apron 9 is automatically rolled upon the drum 10 which is controlled by its spring, as it is well known.

Figure 7:
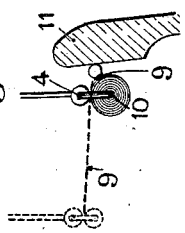
Fig. 7 is a modification of Fig. 6.

The said drum 10 may also, as shown in Fig. 7, be arranged upon the spindle 4 of the rear wind-screen, the front edge of the apron 9 being then attached to the rear wall of the front seat.

Hanging curtains may be arranged upon the sliding tubes of the wind-screen the said curtains being or not attached by their other free ends upon a fixed part of the body.

Figure 9:
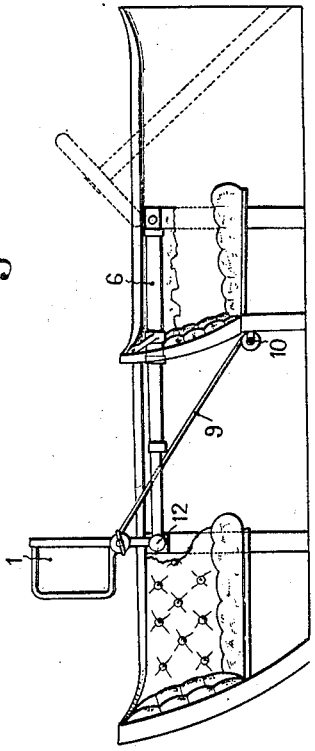

In the constructional example illustrated in Figs. 8 and 9, the pivot spindle 12 of the wind-screen has at each end a stud 13, which as shown in these figures engage supporting devices 14 arranged at each side of the vehicle. Each device comprises a box of circular shape (Figs. 10 and 11) and formed with a horizontal notch 16 to receive the studs 13 of the pivot spindle of the wind-screen.

On each box 15 is mounted a cover 17 likewise formed with a notch 16, and adapted to make a partial rotation of, for instance, one-fourth of a revolution relatively to the box 15; an operating knob 18 being provided for this purpose.

With this construction, when the pivot spindle 12 of the wind-screen is moved towards the rear, the end studs 13 of this spindle enter the notches 16 of the boxes and covers 15 and 17. When the spindle has reached its innermost position in the said notches, the cover 17 is turned by hand in the direction of the arrow in Fig. 11 by moving, for instance, its notch into the vertical position indicated in dot-and-dash lines in Fig. 11; and thereby locking the spindle 12 in place and holding it firmly against all vibration.

In place of that construction the modified construction illustrated in Fig. 12 may be employed which consists in arranging in the notch 16 of the box 15 (which in this case has no cover) a pivoted cam-like member 19 provided with an operating handle $19^a$, and having if desired a return spring 18. This cam-like member has a heel 20 which is adapted to be moved out of the way automatically by the pressure of the stud 13, whereupon it assumes the position shown in Fig. 12 thereby preventing any further movement of the spindle 12.

In the constructional form just described it is assumed in the example illustrated in Figs. 8 and 9 that the entire wind-screen is arranged so as to be in its position of rest against the back of the seat immediately in front and that it can be brought into its position of use shown in these figures by a parallel sliding movement which may be guided, for instance, in a known manner by sliding tubular arms of known construction, which may be arranged against the inner seats of the vehicle. However, the wind-screen may be supported by any other suitable means during its movement from one position to the other, for instance, by means such as illustrated in Figs. 13 to 16.

An apron 9 for preventing the wind from getting under the wind screen is also employed in Figures 8 and 9. The apron is carried by a self-winding drum 10 mounted upon the rear lower portion of the front seat and connected by any suitable means with the pivot of the wind screen.

In the constructional example illustrated in Fig. 13, there is mounted in a suitable support an arm connected by an articulation 25 to a second arm 21, which, in its position of rest is turned down as shown in full lines in Fig. 13. In this construction the wind-screen is provided with supporting rings or clips 22 fitted on to the front ends of the supports 6. When it is desired to move the wind-screen into its rearward position the arms 21 are raised so as to bring them into the horizontal position indicated in dotted lines in Fig. 13. Then these arms are pulled towards the rear in order to engage their rear ends in the box 14. These arms then form slide-ways for the wind-screen proper which may be brought either into its extreme rearward position or be fixed in any desired intermediate position; the arms 21 then constituting rigid supports by reason of their being fixed at their ends.

The arms 21 may be fixed at 23 under the rear seat as shown in Fig. 14 or at 24 behind the front seats as shown in Fig. 15; they may support the wind-screen in such a manner as to allow the latter to be moved into its position of use close to the rear seats.

The free ends of the arm 21 will always be fixed in the fixing box 14 after or without a suitable sliding movement.

In the modification illustrated in Fig. 16 the pivot spindle 12 of the wind-screen may be mounted in such a manner as to be capable of a rocking in supports 26 jointed on horizontal pivot pins 27 fixed to the back of the seat immediately in front. The construction is such that the arms 26 can be turned down so as to engage the supports 14 similar to those shown in Figs. 8 and 9. In this construction, for bringing the wind-screen into its position of use the arms 26 are turned on their pivot pins 27 so that their free ends engage in the supports 14. The said arms 26 will then occupy the position indicated in dot-and-dash lines in Fig. 16. The wind-screen as a whole is raised by causing it to turn on its pivot spindle 12 as indicated by the arrow F.

The movable arms may obviously vary in form in each particular case according to the shape and dimensions of the vehicle to which the entire mounting is to be applied. These arms may, in the position of rest occupy any desired position in the vehicle, the rear wind-screen being brought into its position of use either by the sliding movement of the said arms or by the sliding movement of the wind-screen itself along the side arms after the latter have been brought into proper position.

The fixing of the wind-screen and the locking of the same in position for protecting the rear seats may be effected by any suitable means other than those described in Figs. 10 to 12.

What I claim is:

1. In a wind screen for vehicles, an extensible frame secured at one end to the body of the vehicle forwardly of the rear seat, said frame having lateral extensions at its free end, a glazed frame on the free end of said frame and adapted to be held vertically to serve as a wind shield or horizontally to serve as a table, said lateral extensions adapted to engage the body to support and secure the first named frame, when the glazed frame is used as a wind shield or a table.

2. In a wind screen for vehicles, a frame formed of telescoping sections secured to the vehicle body in front of the rear seat, said frame having outwardly projecting lateral studs at its free end, a glazed frame on such free end of the frame, notched members on the vehicle body and with which the studs of the frame are adapted to engage, and means on the members for locking the studs in the said notches.

3. In a wind screen for vehicles, an extensible frame secured to the vehicle body, said frame having lateral studs at its free end, a glazed frame on the free end of the extensible frame, and bearing boxes notched laterally to receive the studs of the frame and provided with a cover mounted to turn therein and having similar lateral notches adapted to register with the notches of the boxes to admit the studs and when turned, to lock the studs in the boxes.

4. In combination with a rigid mounting for the movable rear wind-screens of vehicles, a device for preventing the wind from getting underneath the rear wind-screen, characterized by the feature that between the lower pivot spindle of the rear wind-screen and the back of the seat immediately in front there is arranged for the protection of the rear seat a protecting apron mounted on a self-winding drum which keeps the said apron always taut.

5. The apron device as claimed in claim 4, characterized by the feature that the drum for winding up the apron is mounted on the rear side of the back of the said front seat.

In testimony I have hereunto set my hand.

MAURICE EYQUEM.